US007685751B2

(12) United States Patent
Knoernschild

(10) Patent No.: US 7,685,751 B2
(45) Date of Patent: Mar. 30, 2010

(54) CARD POSITIONING ASSEMBLY AND METHOD

(76) Inventor: Keith Knoernschild, 3437 Woodland Dr., Mt Vernon, WA (US) 98274

( * ) Notice: Subject to any disclaimer, the term of this patent is extended or adjusted under 35 U.S.C. 154(b) by 368 days.

(21) Appl. No.: 11/536,514

(22) Filed: Sep. 28, 2006

(65) Prior Publication Data

US 2007/0284489 A1 Dec. 13, 2007

Related U.S. Application Data

(60) Provisional application No. 60/803,118, filed on May 24, 2006.

(51) Int. Cl.

| | |
|---|---|
| ***G09F 1/10*** | (2006.01) |
| ***G09F 1/00*** | (2006.01) |
| ***G09F 3/10*** | (2006.01) |
| ***G09F 7/00*** | (2006.01) |
| ***A47G 1/06*** | (2006.01) |
| ***A47G 1/16*** | (2006.01) |
| ***A47G 1/24*** | (2006.01) |
| ***A45D 19/04*** | (2006.01) |
| ***F16M 11/00*** | (2006.01) |
| ***A47G 23/02*** | (2006.01) |
| ***F16M 13/00*** | (2006.01) |

(52) U.S. Cl. .................. 40/124; 40/124.09; 40/124.16; 40/672; 40/611.06; 40/611.07; 40/611.08; 40/765; 40/124.01; 248/473; 248/451; 248/174; 248/175; 248/176.1; 248/152; 248/457; 248/469; 248/513; 248/517

(58) Field of Classification Search .................. 40/124, 40/124.09, 124.16, 672, 611.06, 611.07, 40/611.08, 765, 124.01; 248/473, 451, 174, 248/175, 176.1, 152, 457, 469, 513, 517
See application file for complete search history.

(56) References Cited

U.S. PATENT DOCUMENTS 1,681,586 A 8/1928 Kessler
1,768,675 A 7/1930 Egan
3,779,504 A 12/1973 Schwartz et al.
4,125,243 A 11/1978 Liptak
4,326,349 A * 4/1982 Daughtry .................... 40/733
4,960,258 A * 10/1990 Stocker et al. ............. 248/473
5,042,760 A * 8/1991 Boschetto ................... 248/174
5,058,300 A * 10/1991 Ernest et al. ............ 40/611.12
5,335,796 A 8/1994 Sanford et al.
5,480,036 A * 1/1996 Opar .......................... 211/45
5,560,131 A * 10/1996 Gibson ................... 40/607.12

(Continued)

*Primary Examiner*—Joanne Silbermann
*Assistant Examiner*—Syed A Islam
(74) *Attorney, Agent, or Firm*—Hughes Law Firm, PLLC; Michael F. Hughes

(57) ABSTRACT

Generally speaking, this is a card positioning device which maintains a card such as a greeting card or a postcard in a standing position. The card experiences a destabilizing moment. The card positioning device has a moment resisting section to resist the destabilizing moment and maintain the card in a standing position. The moment resisting section connects to the origin end of the longitudinal fold of the card and extends along the card edges from the origin to reinforce the card edges. The moment resisting section has a foot which has a heel and toe to resist the destabilizing moment. An ornament such as a flag, character or emblem can be attached to the base of the moment resisting section. The ornament, moment resisting section and card, may be inserted into an envelope and mailed to a recipient.

18 Claims, 11 Drawing Sheets

U.S. PATENT DOCUMENTS

| | | | | |
|---|---|---|---|---|
| D386,532 | S * | 11/1997 | Bass | D20/40 |
| 5,890,603 | A | 4/1999 | Arguin et al. | |
| 6,129,323 | A | 10/2000 | Mandokoro et al. | |
| 6,227,504 | B1 * | 5/2001 | Seaberg | 248/174 |
| 6,267,346 | B1 | 7/2001 | Dill et al. | |
| 6,449,886 | B1 * | 9/2002 | Gray | 40/124.01 |
| 6,578,811 | B1 | 6/2003 | Suzuki | |
| 6,676,100 | B2 | 1/2004 | Hsu | |
| 6,745,989 | B2 * | 6/2004 | Domasin | 248/465.1 |

* cited by examiner

CARD POSITIONING ASSEMBLY AND METHOD

RELATED APPLICATIONS

This application claims priority benefit of U.S. Ser. No. 60/803,118, filed May 24, 2006.

BACKGROUND

U.S. Pat. No. 6,745,989 discloses a cardholder which supports or retains a card such as a greeting card. Referring to the summary of the invention section as seen in col. 1 around line 33, "the present invention is a device for holding an article displayed on a supporting surface. Specifically, . . . a cardholder is provided which supports a greeting card. A cardholder is a unitary member comprising two substantially channel shaped holding portions interconnected by a transverse portion. The holding portions form channels for a corresponding leg of the greeting card such that the holder retains the greeting card in an open standing position."

Referring to col. 2 around line 12, "the cardholder supports a card such as a greeting card about the greeting card legs and in an upright or generally V-shaped open standing position." Furthermore in col. 2 around line 16, "the cardholder is a unitary member comprising two substantially channel shaped holding portions interconnected by a transverse portion."

Referring to col. 2 around line 53, "the cardholder is made by bending a single piece of wire. Opposite end portions are bent to form a pair of holder portions downwardly extending from the transverse portion. The holder portions are folded onto themselves to a specified radius to form the pair of integral legs defining a channel there between. The free ends of the legs may be arcuate such that a portion of the legs are positioned in close proximity or abutting each other to provide a pinching or clipping force for retaining the legs of the card."

U.S. Pat. No. 6,676,100 discloses a note holder which relates to holding note paper and cards. The note holder has a foldable capability and includes a body which is pivotably mounted to a base. The base has an inner space for receiving the body when the note holder is folded. A slot is adapted to hold a piece of paper in the body and several fins are formed in the slot of the body. Referring to col. 1 at line 40 of the summary of the invention section, "The main objective of the invention is to provide a foldable note holder so the note holder can save space when it is not in use and can be easily carried."

U.S. Pat. No. 6,578,811 discloses a paper holder, which has minimal components and functions by gravitational action to retain the paper. In col. 1 around line 5, "Present invention relates to an improved paper holder for holding paper or the like which can securely, stably retain paper and minimize danger of fingers being caught in moving components during use." Further down in col. 1 in the summary of the invention at line 55, "Objects are attained by the present invention directed to a paper holder comprising two holding members. The first holding member has a convex holding surface and a second holding member provided with a substantially complementary concave holding surface."Furthermore around line 65 and continuing into line 2, "Upon placement of the holding members gravity automatically creates opposite moments upon the holding members to bias the surfaces of the first and second holding members whereby paper situated between the surfaces is retained in an erect and somewhat curved state without the need for a separate spring component to bias the surfaces together."

U.S. Pat. No. 6,267,346 discloses a device for holding a paper sheet. The device is intended to maintain a sheet of paper close to the vertical in order to facilitate viewing, the device has a first holding means and a second holding means cooperating together to provide an initial curvature which makes the sheet rigid.

U.S. Pat. No. 6,129,323 discloses a sheet stand which has a stand body and a ball. The bottom of the sheet is held between the curved holding surface of the sheet stand and the ball. The ball moves toward the curved surface by its own self weight, grabbing the bottom of the sheet bending the bottom portion inside to make the sheet firmer to stand, thus creating greater section modular depth using a curved surface to provide rigidity.

U.S. Pat. No. 5,890,603 discloses a method and device for attaching objects to appliances. The device is directed to an inexpensive display for attaching pictures, notes and the like to appliances. The invention is substantially flexible, lengthwise to form a band which is extended around the perimeter of the outer surface of the appliance. Articles attach to the display by inserting them into least one channel cup lengthwise into the band. A number of short channels may also be cut as a selected predetermined angle.

U.S. Pat. No. 5,335,796 discloses a greeting card holder, with a base and a top joined by an intermediate support. Around the support are placed a plurality of rods which are received at the base and the top. Cards are placed initially in between any two of the rods with the end of the greeting card being deflected by the support to come back such that the spine of the card resides along one of the rods.

U.S. Pat. No. 4,125,243 discloses a sign holder, which has a flat base of resilient material and two projections. The first projection is convex with a sloped side surface; the second projection is corresponding concave with a sloped side surface spaced from the convex side. Arcuate wedge-shaped trough is thus formed between the side surfaces of the projections. The edge of the signed card or board is inserted in the trough and removably held upright. In the summary of the function in col. 1 around line 43, "An object of the present invention is to provide a reusable sign holder which holds a signed card or board upright without mechanical spring clips or without depending upon the natural resiliency of the signed card."

U.S. Pat. No. 3,779,504 discloses a stand for menus and the like. The stand supports readily bendable articles such as a menu, a photograph, a display card or the like which is flexible in at least one direction. The stand has three posts, two are along a common axis and the third is displaced laterally from that axis. The item supported can be bent into a concave form rigidly supported by engaging the same between posts.

U.S. Pat. No. 1,768,675 discloses a display device for holding price tags, display cards to show in windows, counters and other places where good are kept displayed. As seen in col. 2 around line 77, "The device is made of resilient materials, with wings and may be pressed towards each other to exert a pinching effect on a card or article." The device has a base, upwardly converging wings and the wings may be in one piece with the base and bent upward and inwardly from opposite edges. The base can be rectangular. The free edge portions of the wings terminate close to one another but are spaced sufficiently apart to provide a slot to receive a card, mirror, or other article which is desired to be supported by the device.

U.S. Pat. No. 1,681,586 discloses a display card holder. The invention is to provide a holder which is relatively flat and adapted to rest on the floor of a show window or similar support. It provides support for thin advertising and like cards without additional supporting means for the upper ends of the cards. The slots are slightly inclined from the vertical with the slots preferably curved. The lower edge of the card is inserted in the slot; the slot causes the card to assume a slight horizontal curvature, which efficiently renders the card self-supporting and thus it is unnecessary to provide any means for holding the upper edge of the card.

DESCRIPTION OF THE PREFERRED EMBODIMENTS

The current embodiment relates to a card positioning apparatus as well as an assembly for maintaining greeting cards, postcards and other seasonal type ornamental parts in an upright position when placed on display supported by a surface such as a countertop, desktop, shelf, window ledge, mantle, or other surface which may have a low coefficient of friction. The card without the use of the current embodiment during certain environmental loading events would tend to fall flat.

Figure 1:
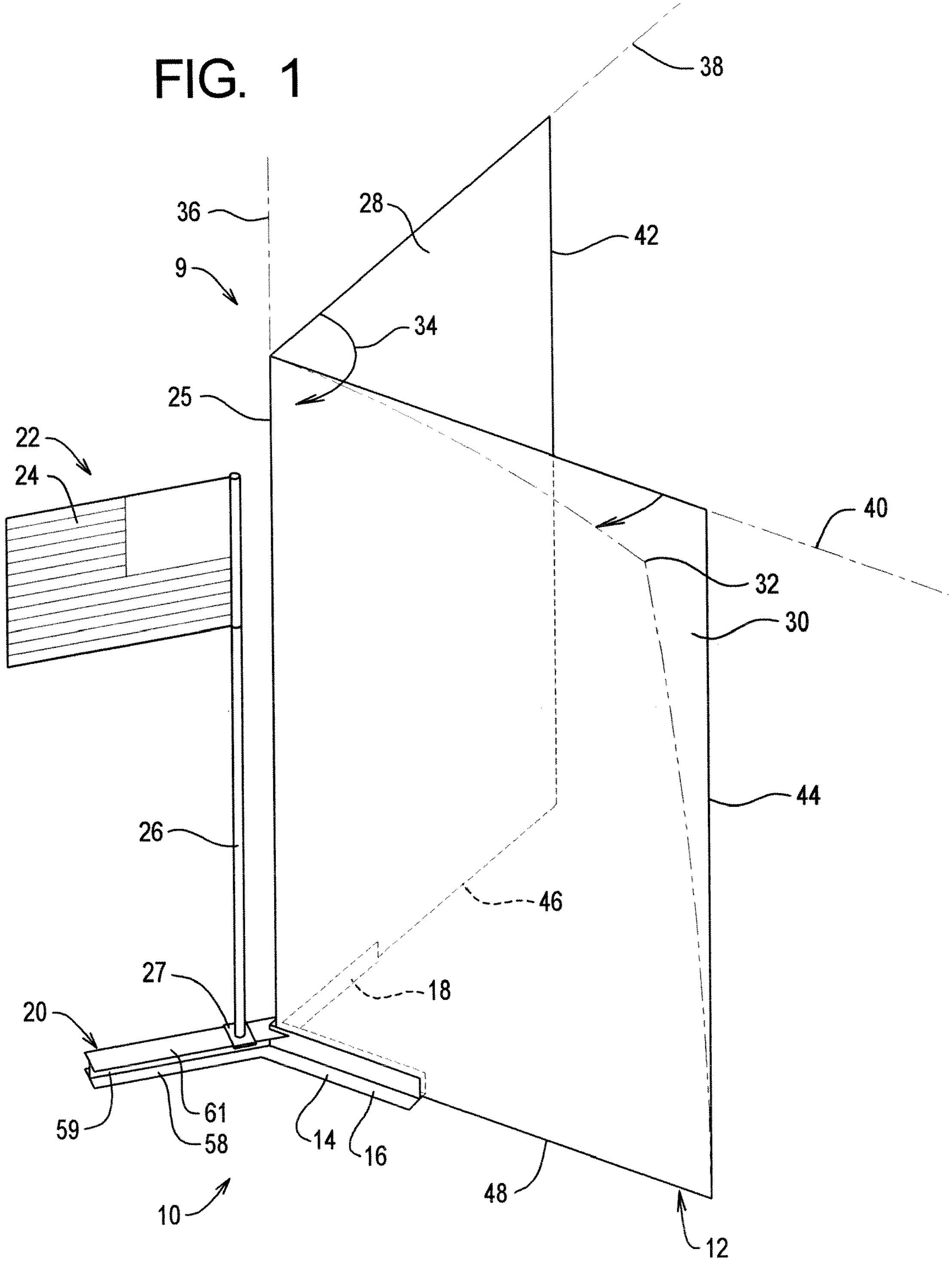
FIG. 1 is a perspective view of the card positioning apparatus holding the card in a portrait position.

Generally speaking, greeting cards are usually placed on a display surface in either a portrait-type position or landscape-type position. Referring to FIG. 1, a card 12 is shown in a card portrait position 9 where the card has a first card leg 28 and a second card leg 30, each radiating from a longitudinally aligned axis 36, which is an extension of the longitudinally aligned fold 25. Each card leg has equal but opposite card leg end edges. For example, the first card leg 28 has a first card leg end edge 46 positioned at the vertically lower portion of the card leg as well as an end edge 46 positioned at the vertically upper portion of the first card leg. Similarly, the second card leg 30 has a second card leg end edge 48 which is positioned at the lower vertical portion of the card leg and an equal but opposite end edge 48 positioned at the vertically upper portion of the card leg. These card end edges run perpendicular to the longitudinally aligned axis 36. The longitudinally aligned fold 25 for the most part bisects the card into two equal but opposite card legs: the previously-mentioned first card leg 28 and the second card leg 30.

At the radial end of the card legs is an outer edge which is substantially parallel to the longitudinally aligned fold 25 and the longitudinal axis 36. Each radially aligned card leg has its own outer card leg edge. In particular, the first card leg 20 has a first card leg outer edge 42 and the second card leg 30 has a second card leg outer edge 44.

Because the greeting card is generally constructed of a single unitary piece of card stock folded along the longitudinally aligned fold 25, the card legs tend to return to their original flat position. This occurs in part because the tensioning of the outer fibers about the longitudinal axis 36 of the card, and the compression of the inner card fibers on the inside face of the card wish to return to their normal unstressed state. Also, air pressure will tend to force open the card legs and what generally happens is a destabilizing moment 34 occurring about the longitudinally aligned axis 36. The moment derives from the opening force 32 applied to the card, which will be discussed further below.

Figure 4:
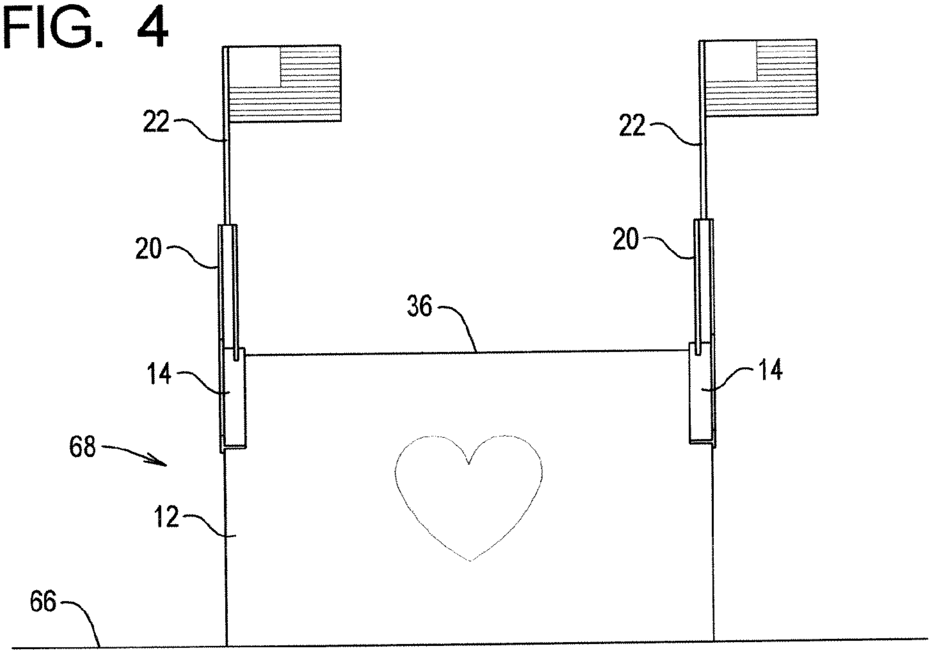
FIG. 4 is an elevational view of the card in a landscape position.
Figure 12:
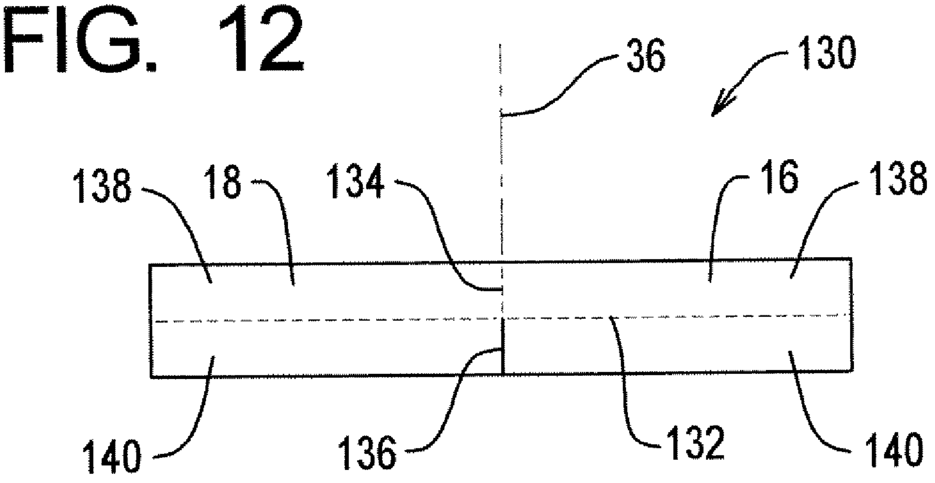
FIG. 12 is a plan view of an alternative embodiment of the moment resisting section.

A moment resisting section 14 is used to maintain the card in the card portrait position 9, as well as the card landscape position 68 as seen in the FIGS. 4, 12 and 15 arrangements. The moment resisting section 14 forms a card positioning apparatus in one embodiment and includes a first radially aligned leg 18 rigidly attached to a second radially aligned leg 16 with a toe leg 20 extending radially outwards from the origin point, the origin being centered on the longitudinally aligned axis 36. An ornament 22, which in one embodiment is shaped as a flag 24, can be attached to the toe leg 20 portion of the moment resisting section 14. The first radially aligned leg 18 is arranged along a first card leg radial axis 38, which substantially matches the position the user desires the first card leg 28 to be located along. Similarly, the second radially aligned leg 16 is arranged along a second card leg radial axis 40, which substantially matches the position the user desires the second card leg 30 to be located along.

Figure 13:
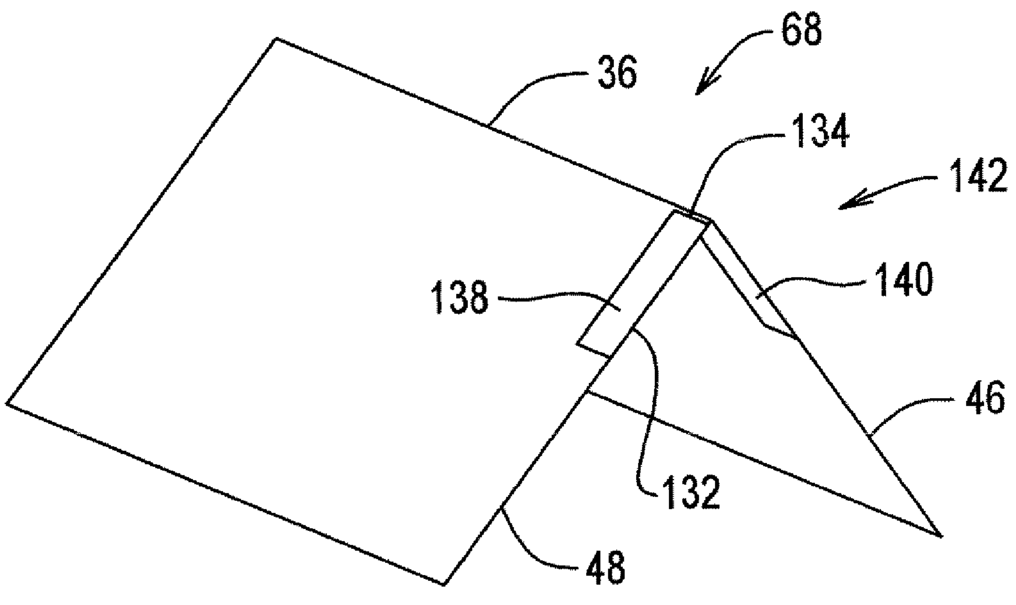
FIG. 13 is a perspective view of an alternative embodiment of the moment resisting section supporting a card in a landscape position.
Figure 13A:
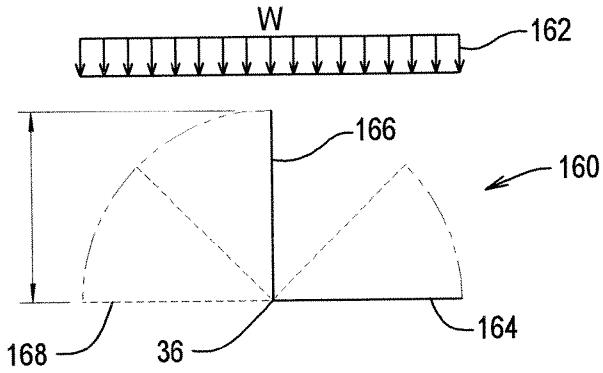
FIG. 13A is a plan view of a loading diagram on a card in a portrait standing position.

In order to provide a clear understanding of the use of the moment resisting section 14 as placed at the end card edge location, a brief discussion will now be provided of the existing greeting card as it is positioned in a portrait-type standing arrangement as seen in FIG. 13A, and discussing the air pressure conditions or events as previously mentioned.

Referring to FIGS. 13A-13D, an existing greeting card in a portrait standing position 160 is shown from a top-down view to illustrate the air pressure loading diagram 162, which can act against the major loading leg 164 as well as possibly the minor loading leg 166 of the card. For discussion purposes, the reference will be described where the major loading leg 164 stays in a constant position and the minor loading leg 166 rotates between 0 and 180°. The major loading leg 164 defines the overturning axis 168 in this particular embodiment, which in other words is the overturning point where the air pressure 162 will force the card to tip over and fall on its' face.

Figure 13B:
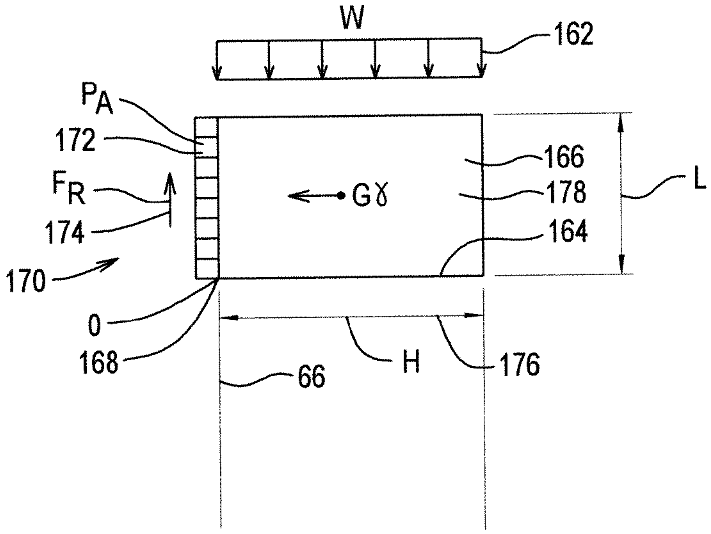
FIG. 13B is an elevational view orientated sideways of a loading diagram on a card in a portrait standing position.
Figure 13C:
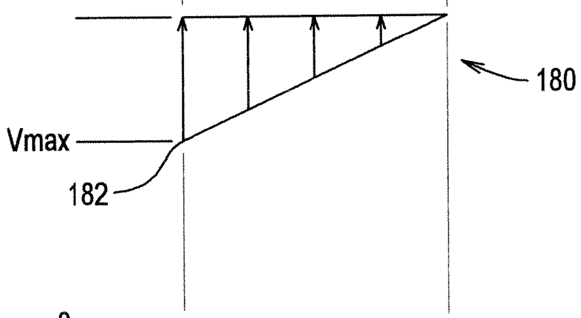
FIG. 13C is an elevational shear diagram.
Figure 13D:
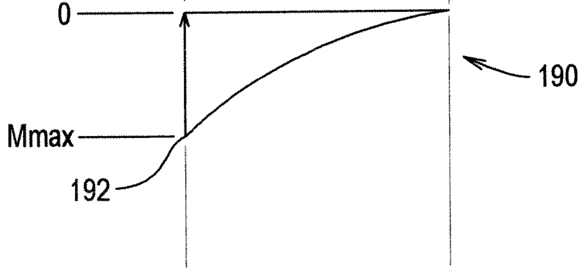
FIG. 13D is an elevational moment diagram.

Referring to FIG. 13B, an existing air pressure loading on a portrait standing card 170 is shown where the minor loading leg 166 is shown in a cantilevered arrangement and the major loading leg 164 runs perpendicular to the minor loading leg 166. The minor loading leg 166 is anchored to the surface 66 by its' self weight 178 and exerts a uniform pressure area 172 on the surface 66. The self weight of the minor loading leg 166 perpendicular to the air pressure load 162 and the frictional resistance 174 combine to anchor the card in its' portrait standing position and resist the destabilizing moment about the origin over tipping point 168.

The card will begin to slide when the air pressure loading 162 exceeds the maximum shear capacity 182, which is essentially the combination of the self weight of the card acting on the surface pressure area 172 in combination with the frictional resistance along the card edge 174 between the end edge and the surface.

This is also the loading limit at which the portrait positioned greeting card is susceptible to overturning at the maximum destabilizing moment 192. This tipping limit will occur when the air pressure applied over the height 176 of the card exceeds one half of the height squared of the card in combination with the unit weight of the card along the card edge and the frictional resistance.

Thus, to stabilize the card in a portrait position as seen in 160, as well as resist the existing maximum destabilizing moment tolerance on the portrait card as seen at 190, the moment resisting section has been provided with the following arrangement as seen in FIGS. 14A-14D.

Figure 14A:
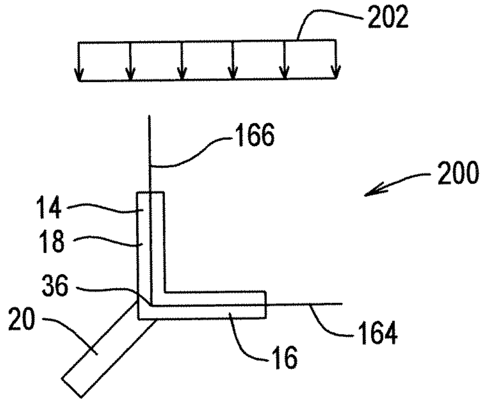
FIG. 14A is a plan view of a moment resisting section attached to a card in a portrait standing position showing a loading diagram.

Referring now to FIG. 14A, a moment resisting section holding a greeting card in a portrait position 200 is shown in a plan position or plan view with the minor leg 166 maintained in its' position by a first radially aligned leg 18 of the moment resisting section 14 and the major loading leg 164 maintaining its' position by a second radially aligned leg 16. The toe leg 20 extends radially outwards from the longitudinally aligned axis 36 to provide additional stability. An air pressure load 202 is applied perpendicular to the major loading leg 164.

Figure 14B:
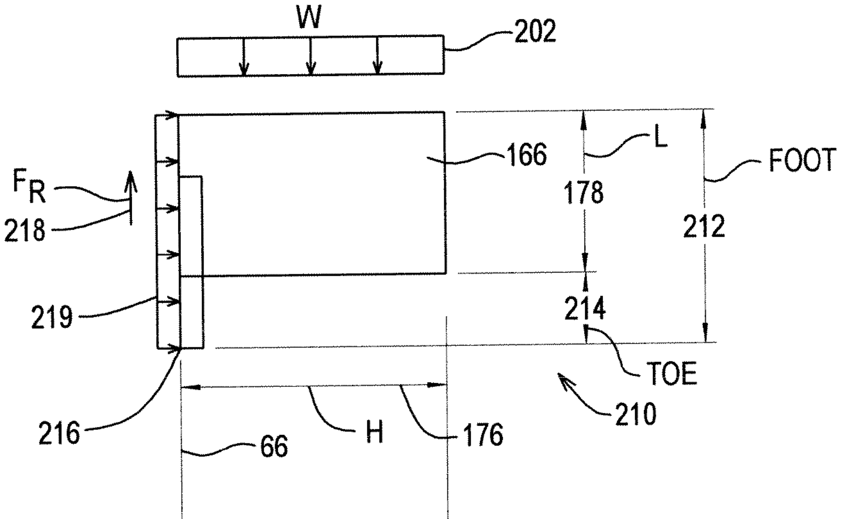
FIG. 14B is an elevational view orientated sideways of a loading diagram on a card in a portrait standing position with the moment resisting section.

FIG. 14B shows the greeting card in combination with the moment resisting section in a cantilevered arrangement with the weight of the minor loading leg 166 and now the major loading leg 164 as well as the moment resisting section 14 combined to provide an increased pressure area 219 on the surface 66, the pressure being distributed along the entire foot 212 which includes the length 178 of the greeting card leg and the transverse toe distance 214. This foot distance 212 also increases the length of the frictional resistance 218. By extending out the overturning toe point 216 from the original longitudinally aligned axis point 36 (as seen in FIG. 14A), towards the outer edge of the toe leg 20, the frictional resistance is increased as well as the maximum destabilizing moment required to overturn the card.

Figure 14C:
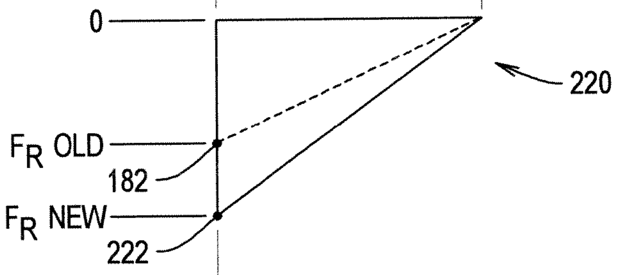
FIG. 14C is an elevational view of a shear diagram showing increased maximum sheer tolerance from the moment resisting section.
Figure 14D:
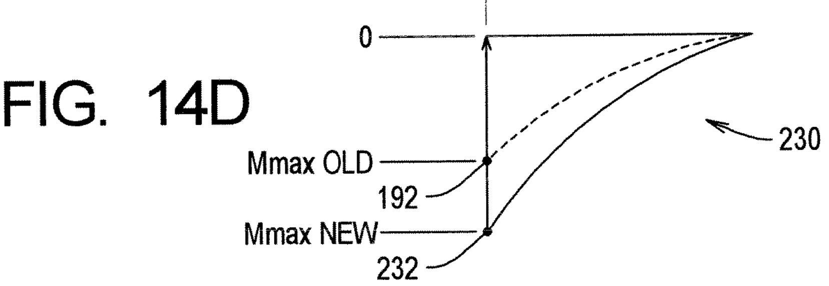
FIG. 14D is an elevational view of a moment diagram showing increased maximum moment from the moment resisting section.

Referring to FIG. 14C, an increased maximum shear tolerance loading on the moment resisting section in combination with the portrait standing card 220 is seen. Now the air pressure load 202 in combination with the height of the card 176 must be greater than or equal to the pressure area 219 in combination with the frictional coefficient and the sum of the length of the card and the transverse toe distance.

Along similar lines, the required over tipping or maximum destabilizing moment 232 which requires the wind or air pressure load 202 in combination with the height to increase to a maximum greater than or equal to one half of the height squared of the greeting card 176 in combination with the pressure area and additional combination with the frictional resistance combined with the foot distance. In other words, by increasing the foot distance and specifically the toe, the air pressure load 202 must be increased proportionally to overturn the greeting card standing in a portrait position. Where the greeting cards are generally within a controlled environment and are exposed to air pressure events which may just be passing individuals, creating air currents, the brief increase in wind current or air pressure load 202 will be less likely to effectively overcome the stabilizing action of the moment resisting section 14.

In addition to the moment resisting section 14 providing stability for a greeting card in a portrait standing position, the moment resisting section 14 can also provide stability in maintaining a greeting card in a landscape standing position. Referring to FIG. 15A-15D, a moment resisting section holding diagram positioning a greeting card in a landscape arrangement 250 is shown where the moment resisting section 14 is attached to the support legs 252 of the greeting card where the first radially aligned leg 18 and the second radially aligned leg 16 reinforce the support legs 252 at the first card leg end edge 46 and the second card leg end edge 48. As can be seen in the profile view and as will be discussed further below, the moment resisting section 14 can be placed at just one or both ends of the longitudinally aligned fold 36 of the card 12.

Figure 15A:
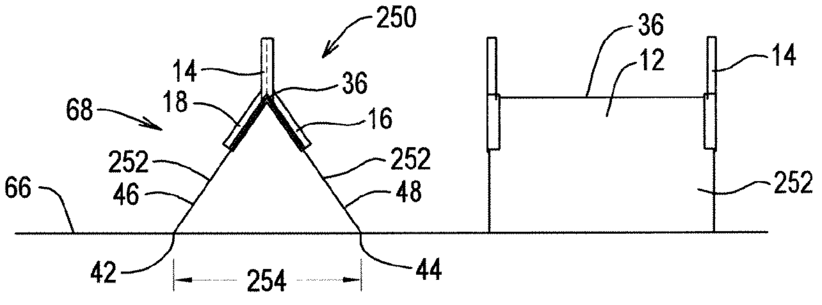
FIG. 15A is an elevational view of a moment resisting section holding a greeting card in a landscape position.
Figure 15B:
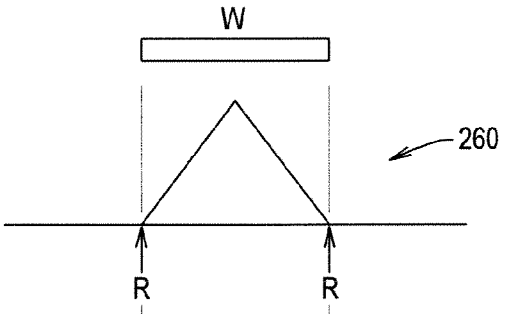
FIG. 15B is an elevational loading diagram of a dead loading arrangement on a card held by a moment resisting section in a landscape position.
Figure 15C:
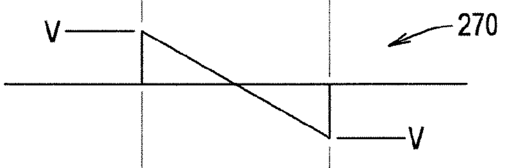
FIG. 15C is a shear loading diagram on the moment resisting section holding the card in a landscape position.

Here, the first card leg outer edge 42 and the second card leg outer edge 44 are in the ground engaging position with the surface 66. As can be seen in FIG. 15B, the dead loading 260 on the moment resisting section holding the greeting card in a landscape position can be equated to the dead weight of the card itself acting on a pin and roller type support arrangement at the resisting locations where the frictional resistance between the outer card leg edges is minimal depending on the type of surface that the card is standing on. Furthermore, the longitudinally aligned axis 36 is located at the position within the loading diagram where the greatest destabilizing moment occurs. Concurrently, this longitudinally aligned axis 36 provides essentially a pinned type joint connection which has minimal ability to resist the couple or destabilizing moment at its' greatest point (mid span of the simple span "beam"). In order to maintain the card in this standing position and reinforce the longitudinally aligned axial joint 36, the moment resisting section 14 acts to substantially increase the cross-sectional depth of the card at the destabilizing moment's greatest location while reinforcing the legs as previous discussed.

Figure 2:
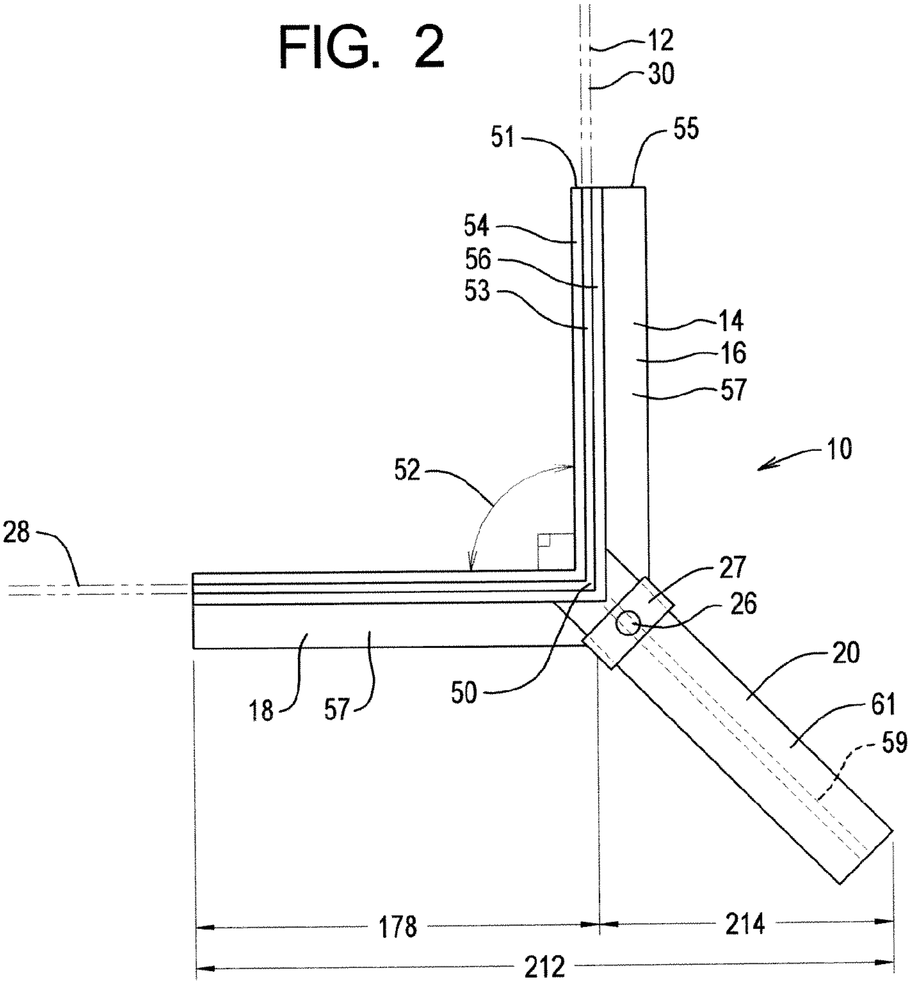
FIG. 2 is a plan view of the moment resisting section supporting the card.

Further discussion of the current embodiment of the moment resisting section 14 which is incorporated into the card positioning assembly 10 (as seen in FIG. 2) will now be provided. In this present embodiment, the card 12 is arranged at a 90° angle with the first card leg 28 perpendicular to the second card leg 30. The card sits in a card holding channel 53 which is defined by two vertically positioned side walls, an inner card holding wall 54 and an outer card holding wall 56. The inner card holding wall is arranged along the inner edge/face of the first and second radially aligned moment resisting section legs. As previously discussed, each of the radial legs extend from the radial origin 50, which is the longitudinally aligned axis 36. A third leg as previously discussed extends radially outward from this radial origin 50 at a direction substantially bisecting the 90° perpendicular card legs. This third radially aligned moment resisting section leg acts as a toe leg 20 providing the previously discussed resistance to overturning moment about the overturning origin point 168 as detailed in FIGS. 13B and 14B.

As mentioned in FIG. 14B, the moment resisting section has a foot base 212, which sits perpendicular to the card leg experiencing the overturning moment. In this particular example, the second card leg 30 is perpendicular to the foot 212. The heel 178 and the toe 214 combine together for the foot 212. While the third radially aligned leg 20 acts as an additional toe, each of the radially aligned legs has their own leg foot 57 arranged perpendicular to the correlating card leg. For example, the second card leg 30 correlates to the second radially aligned leg 16 of the moment resisting section which has a leg foot 57 arranged perpendicular to the second card leg providing a base. The leg foot 57 has a rear heel 51 and a forward toe 55. The card holding channel 53 is positioned above the rear heel 51 to support the second card leg 30.

While the moment resisting section 14 provides stability for the card 12 in this particular embodiment as in a standing portrait position, the third radially aligned leg 20 also acts as or is configured for an ornamental attachment. As discussed in FIG. 1, the radially aligned third leg 20 is configured to accept an ornamental base 27. The third leg 20 in this particular embodiment is shaped in cross-section substantially as an I-beam, with a leg bottom flange 58, a leg web 59, and a leg top flange 61. The ornamental base 27 is essentially an inverted C-channel, which is sized to slidably attach onto the leg top flange 61. Attached to the ornamental base 27 is the longitudinally aligned pole 26 for in this case the ornament 22 which is a flag 24 as seen in FIG. 1.

Discussing alternative embodiments and positions of the radially aligned legs of the moment resisting section 14, the leg position angle 52 is in this particular embodiment set at a right angle of 90°. Additional standing arrangements are provided, including an angular range provided in increments of approximately 15° starting with a leg position angle of 15°, 45°, 60°, 75°, 90°, 105°, 120°, 135°, 150°, 165°, or even 180°, this last angular position would then essentially lay the card 12 flat in an upright position.

While the legs are rigidly attached to one another at the radial origin 50, an alternative embodiment provided would be to include a radial hinge. The hinge may or may not be spring-loaded with hinge arms extending out into the radially aligned legs. The radially aligned legs may then be folded together and secured by a latch at the outer ends of the legs, then repositioned to the card holding arrangement by unlatching the securing device allowing the spring-loaded hinge to open the legs to the proper leg position angle 52.

Figure 5:
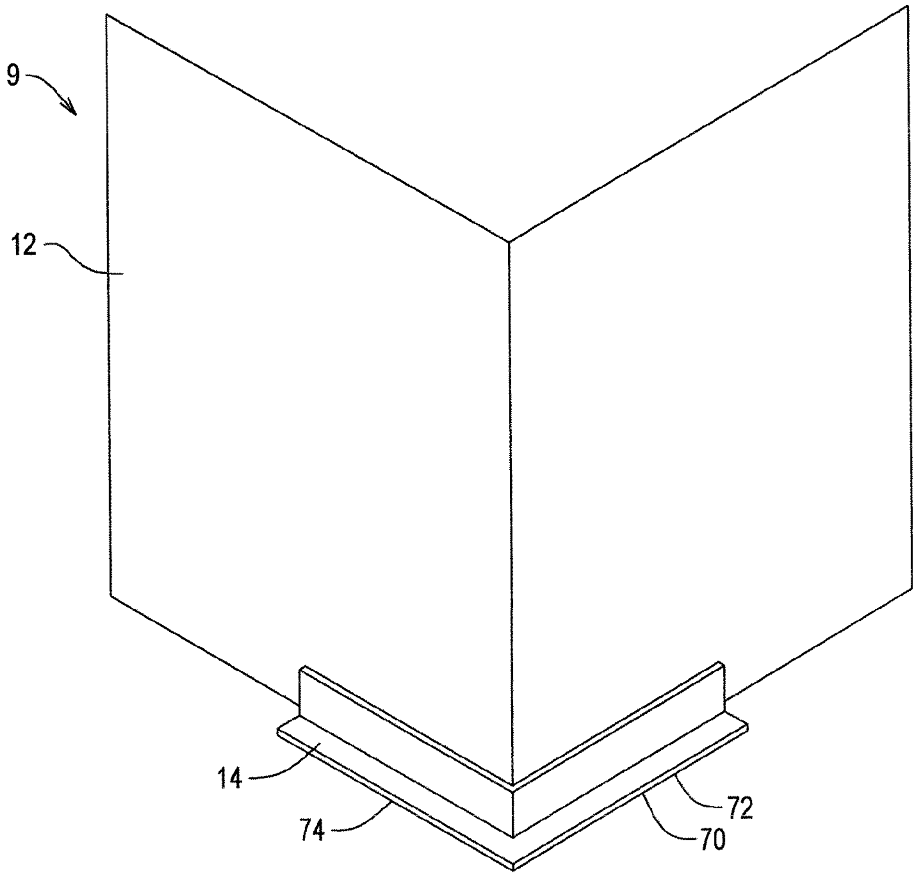
FIG. 5 is an oblique view of the moment resisting section supporting a card in a portrait position.
Figure 6:
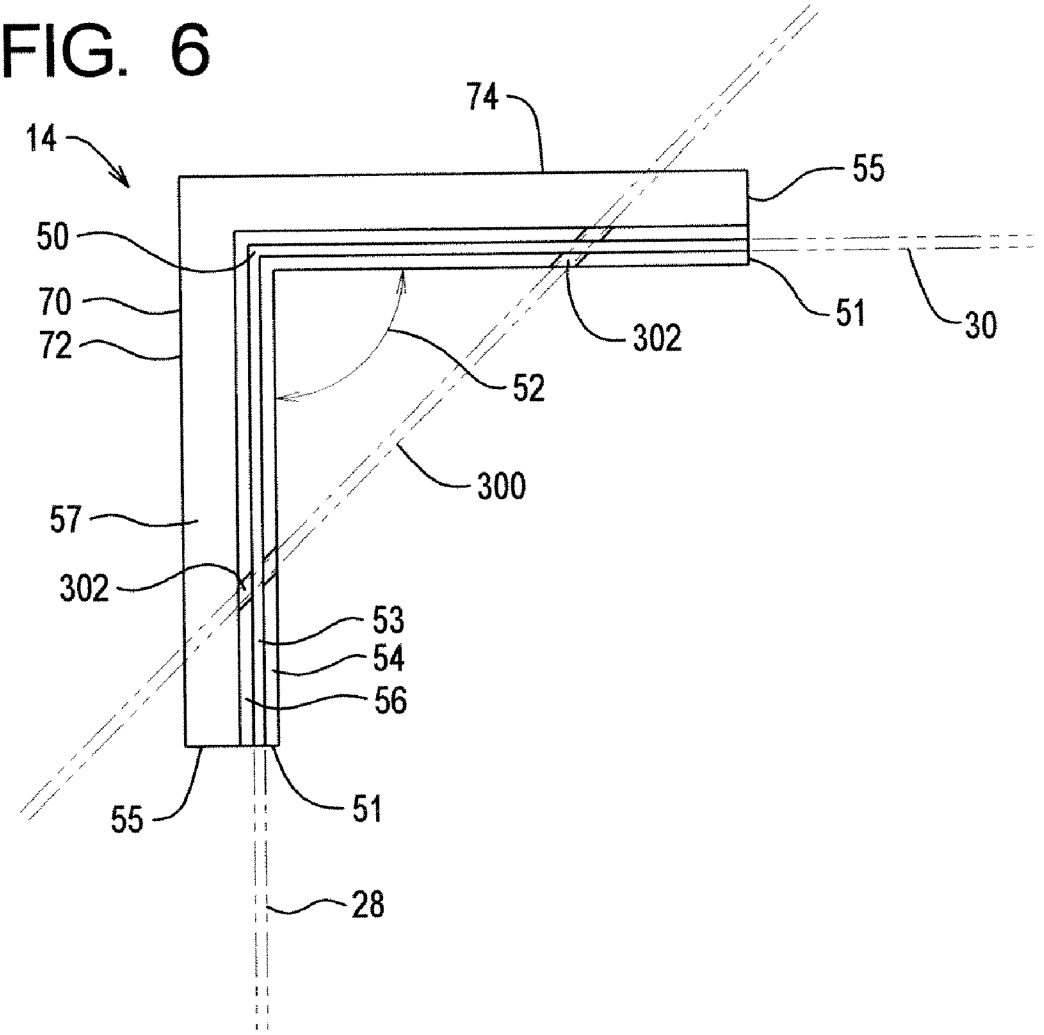
FIG. 6 is a plan view of the moment resisting section.

An alternative and simplified embodiment of the moment resisting section 14 (as seen in FIGS. 5 and 6), is without the use of the third radially aligned leg 20. Here the stabilizing effect comes from the leg foot 57, the rear heel 51 and forward toe 55 of each of the radially aligned legs. An optional transversely aligned post card slot 302 is provided for each post card where the slot runs perpendicular to an angle bisecting the leg position angle 52.

Figure 3:
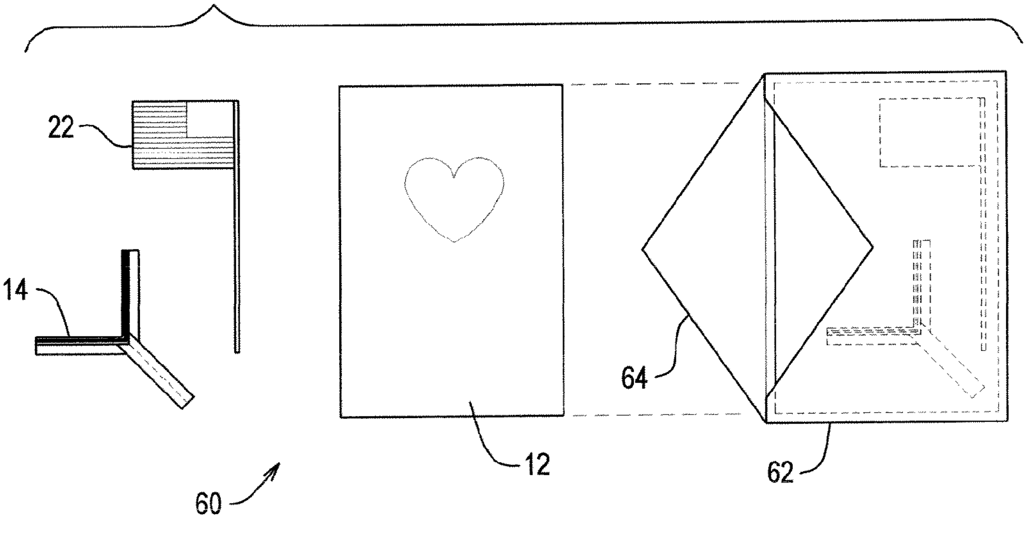
FIG. 3 is an elevational view of the card positioning assembly.

The longitudinal height of the moment resisting section card holding channel walls 53 (as seen in FIGS. 1-3), is kept to a minimum so that the moment resisting section 14, the ornament 22 and the card 12 can be placed into an envelope 62, which taken together forms a card positioning kit 60.

Referring to FIG. 4, the card landscape position 68 is held in place, in this particular configuration, by two moment resisting sections 14 at either end of the longitudinally aligned fold 36. As mentioned in FIG. 15A, the first card leg and second card leg are both supported and reinforced by the first radially aligned leg 18 of the moment resisting section and the second radially aligned leg 16 of the moment resisting section. In this particular arrangement, the radial end of the toe leg 20 supports the ornament 22. The moment resisting sections maintain the card in this standing position while resting on the smooth surface 66 which has a low frictional resistance as previously discussed.

Figure 8:
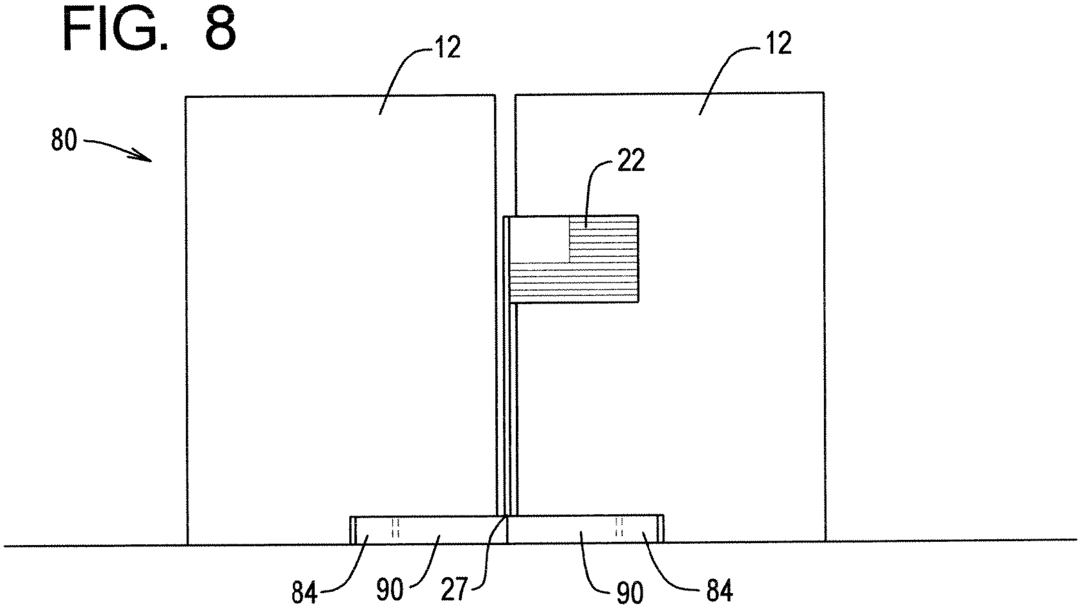
FIG. 8 is an elevational view of an alternative embodiment of the card positioning apparatus.
Figure 8A:
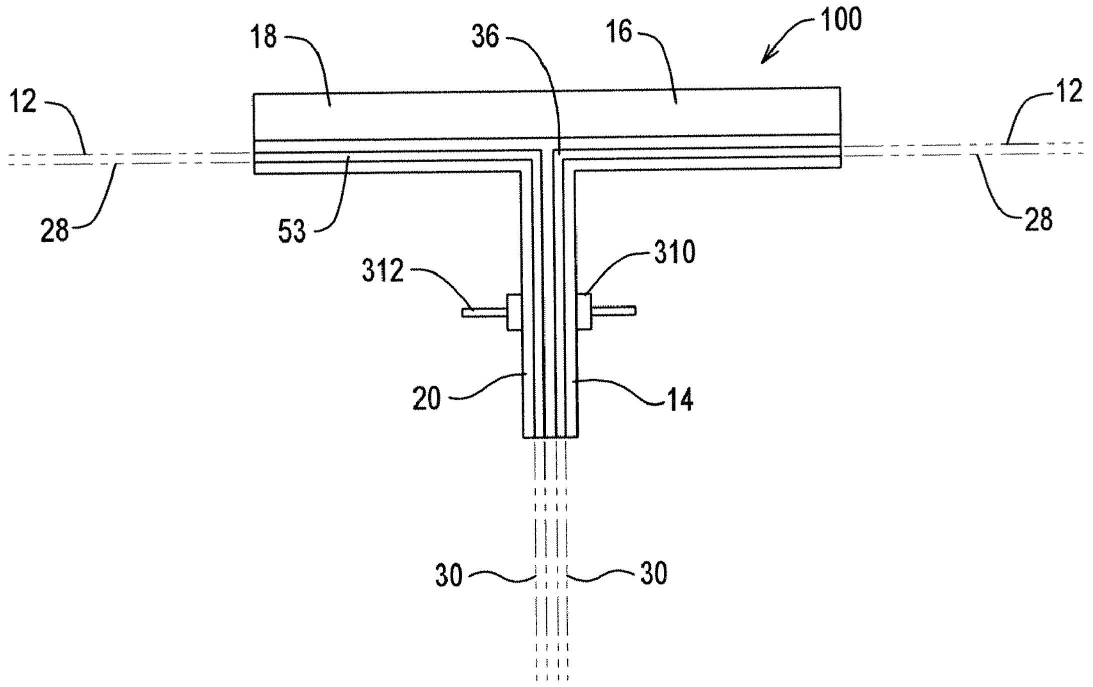
FIG. 8A is a plan view of an alternative embodiment of the card standing apparatus.

In order to connect the moment resisting section 14 to the card 12, a connection section or connection arrangement of some sort is provided. In the first particular embodiment, as previously discussed in FIG. 2, the card 12 sits within the radially aligned card holding channel 53. The channel walls are spaced apart from one another to provide just enough for the thickness of the card 12 to fit tightly within the channel 53. In addition to utilizing the channel connection 53, a longitudinally aligned clip section 312 (as seen in FIG. 8A), supported by a hinge base 310 allows the bar portion of the clip 12 to rotationally translate into a longitudinal position and provide a force against the inner card face. Optionally, the card can have, attached to the interface of the card, a longitudinally aligned slot which is affixed via an adhesive, through which the longitudinally aligned bar portion of the clip 12 can extend to secure the card to the moment resisting section at a higher longitudinal location.

Briefly discussing the dual card standing apparatus or T-shaped design 100, the moment resisting section 14 includes a first radially aligned leg 18 which originates from the origin 36 and is substantially in the same plane as the second radially aligned leg 16. The third radially aligned leg 20 is perpendicular to the first and second legs, where the first and second legs support a first card leg 28 for the two cards supported in this particular embodiment. The third radially aligned leg 20 maintains the second card leg 30 for the two cards supported. A channel connection section 53 is utilized to maintain the cards in their standing portrait positions, but alternative connection section arrangements can be utilized as well.

Figure 7:
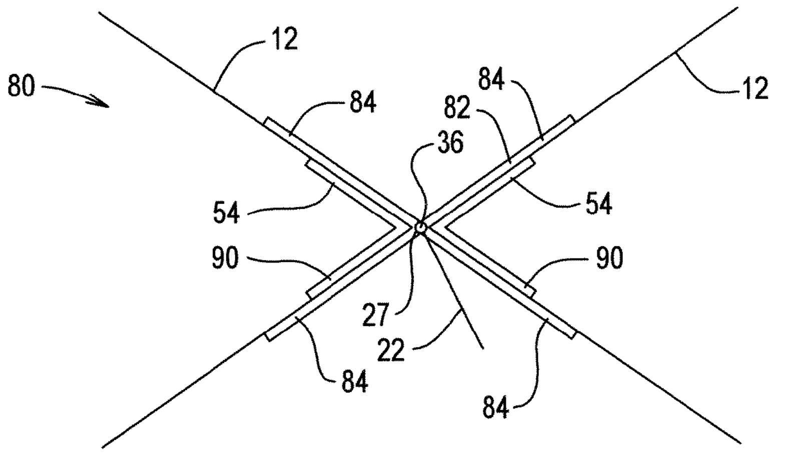
FIG. 7 is a plan view of an alternative embodiment of the card positioning apparatus.
Figure 9:
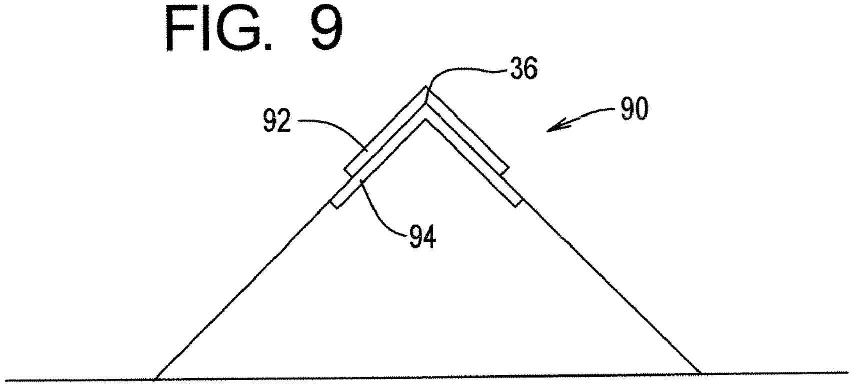
FIG. 9 is a cross-sectional view of an alternative embodiment of the moment resisting section.

One such alternative design includes the use of magnetic clips. Referring to FIGS. 7-9, an alternative embodiment includes the use of a connection section which utilizes magnetic moment resisting section 90, including a magnetic outer wall 92 and a magnetic inner wall 94 where the polarities of the outer wall and inner wall are opposite to attract and exert magnetic forces through the card material.

As seen in FIG. 7, a dual card standing apparatus 80 is provided where the dual card moment resisting section 82 has a plurality of base legs 84 which are arranged in a substantially cruciform or a cross-type arrangement having an ornament base at substantially the center point of the longitudinal axis 36. The ornament 22 rests within a support channel seat which is substantially cylindrical in shape. The legs 84 radiate outward from the cylindrical channel. In this particular embodiment, the cross legs 84 provide an overturning resistance and act as the heel and toe for the various overturning moments experienced during a wind load pressuring event. The cards 12 are secured to the metallic cross legs 84, in this particular embodiment, by magnetic inner wall angles 54 which the user places on the back wall portion of the card 12 to maintain the card in its upright position.

Figure 11:
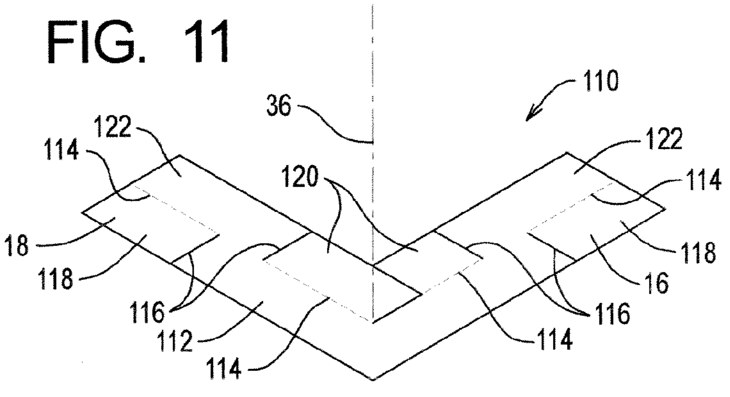
FIG. 11 is a detail view of an alternative embodiment of the moment resisting section.

In addition to the magnetic moment resisting section 90, as discussed in FIGS. 7-9, a galvanized metallic sheet moment resisting section 110 as seen in FIG. 11 is provided.

Figure 10:
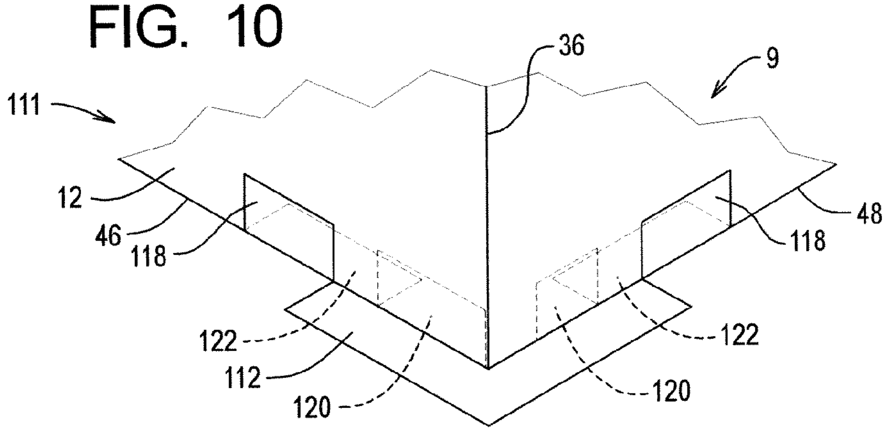
FIG. 10 is a detail view of an alternative embodiment of the moment resisting section.
Figure 10A:
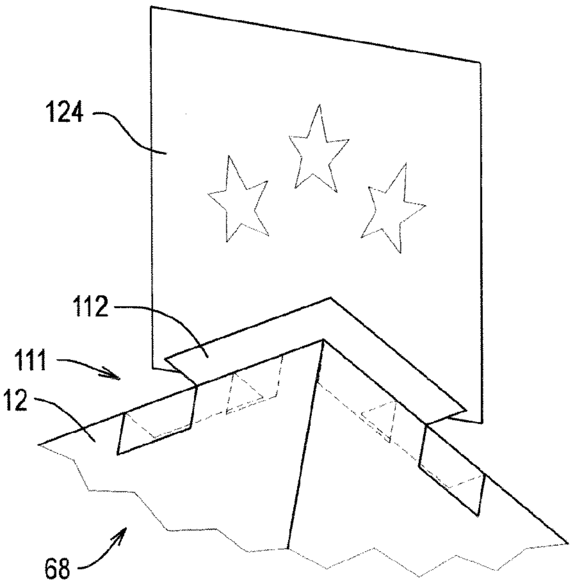
FIG. 10A is a detail view of an alternative embodiment of the moment resisting section.

In this particular embodiment, the moment resisting section is cut out of a metallic sheet for its' intended support of the card in a portrait position 9 or support of the card in a landscape position 68 as seen in FIGS. 10 and 10A respectively. The first embodiment of the galvanized metallic sheet includes the galvanized metallic sheet moment resisting section 110 in its' prefold arrangement where the first leg 18 and the second leg 16 radiate from the longitudinal axis and are defined by a fold score 114 where the card 12 bottom edge or end edge 46 and 48 as seen in FIG. 10, are positioned to be seated along the fold score 114. Transverse cutlines 116 are arranged perpendicular to the fold score 114 to allow portions of the metallic sheet moment resisting section 110 to be articulated and folded upwards against the front and back faces of the card 12 for each particular leg. For example, an outer face fold wall 118 is provided after the cutline 116 is scored for both the first and second radially aligned legs. Similarly, an inner face fold wall 120 articulates upwards to support the rear face of the card 12. After the user bends the fold walls 118 and 120 into their longitudinally aligned positions, the card is held (as seen in FIG. 10) in a card portrait position 9 with the outer foot 112 resisting overturning and the inner foot 122 providing additional surface engaging frictional resistance along with the outer foot 112. The card can also be placed in a landscape position 68 (as seen in FIG. 10A) with the same use of the fold walls as previously discussed above. The outer foot 112 can then be used to provide an attachment means for an ornamental object 124 wherein adhesive is applied to either the bottom face of the outer foot 112 or the front face of the ornament.

Figure 15D:
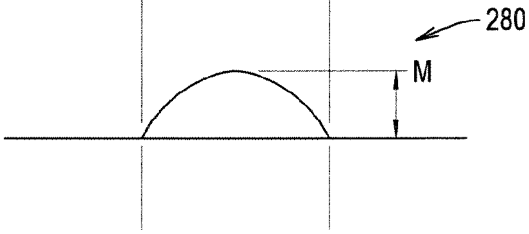
FIG. 15D is a moment loading diagram of the moment resisting section holding a greeting card in a landscape position.

Referring to FIGS. 12 and 13, the card can also be held in a landscape position 68 through the use of a longitudinally aligned bendable moment resisting section sheet 130. The first leg 18 and second leg 16 start out as a flat galvanized metal sheet in a rectilinear position, with a card edge fold line 132 score to bisect the sheet 130. The longitudinally aligned axis 36 of the moment resisting section sheet 130 has a portion of the axis for the sheet scored along a fold line 134 along the longitudinal direction, and a longitudinally aligned cut 136 allowing the bottom face folds 140 of the respective first and second radially aligned legs to fold underneath the card. Because of the malleability of the sheet metal, the user can as seen in FIG. 13, arrange the moment resisting section 130 at the end edge 46 and 48 of the respective card legs, and position the longitudinal fold line 134 of the moment resisting section 130 along the longitudinal axis fold 36 of the card and arcuately rotate the bottom face fold 140 for both radiating legs underneath the end edges and press them against the bottom or interface of the card 12. The longitudinally bendable moment resisting section 130 can then be folded along the fold axis 36 along with the card 12 to position in the card landscape position 68 and thus reinforce the standing landscape position 68 by resisting the dead loading weight 260 as seen in FIG. 15B and reinforce the maximum moment 280 as seen in FIG. 15D.

I claim:

1. A card positioning apparatus comprising:

a) a card experiencing a card destabilizing moment, a moment resisting section configured to resist said card destabilizing moment and maintain said card in a standing position;

b) said card comprising a longitudinally aligned fold having a first origin end, a first card leg and a second card leg radially extending from said longitudinally aligned fold, a first origin edge end radially extending from said first origin end;

c) said card further comprising a first origin edge perpendicular to said longitudinally aligned fold and extending along said first card leg from said first origin end, a second origin edge perpendicular to said longitudinally aligned fold and extending along said second card leg from said first origin end;

d) said moment resisting section further comprising a first leg member connected to a second leg member along a lateral axis, said first leg member and said second leg member radially extending from said lateral axis at a leg position angle;

e) said moment resisting section further configured to connect to said first origin end of said longitudinally aligned fold;

f) said first leg member further comprising a first connection portion to maintain a non-adhesive connection with said first card leg along said first origin edge, said second leg member further comprising a second connection portion to maintain a connection with said second card leg along said second origin edge;

g) said moment resisting section further comprising a foot portion, said foot portion comprising a heel section and a toe section;

h) card ornament interoperable with said moment resisting section, said card ornament comprising an ornament base to provide a seated connection to said moment resisting section.

2. The apparatus according to claim 1 wherein said moment resisting section further comprises: a third leg member interconnected with said first leg member and said second leg member along said lateral axis, said third leg member radially extending from said lateral axis and bisecting said leg position angle.

3. The apparatus according to claim 1 wherein said ornament base comprises a pole with a flag attached thereto.

4. The apparatus according to claim 2 wherein said moment resisting section further comprises: said leg position angle substantially 180 (deg), said third leg member substantially perpendicular to said first and second leg members and bisecting said leg position angle.

5. The apparatus according to claim 1 wherein said standing position further comprises a portrait standing position comprising said longitudinally aligned fold arranged perpendicular to a support surface, said first origin end positioned at said support surface, said card destabilizing moment comprising an air pressure condition against said first card leg about said first origin edge.

6. The apparatus according to claim 1 wherein said standing position further comprises a landscaped standing position comprising said longitudinally aligned fold arranged parallel with a support surface, said first card leg further comprising a first card leg outer edge parallel with said longitudinal fold, said second card leg further comprising a second outer edge parallel with said longitudinally aligned fold, said second card leg edge and said first card leg edge supported by said support surface, said card destabilizing moment comprising a uniform dead load of said card acting about said longitudinally aligned fold.

7. The apparatus according to claim 5 wherein said moment resisting section further comprises said foot portion having a frictional resistance against said surface area to resist said air pressure condition, said toe section of said foot portion further comprising a transverse toe distance extending perpendicularly away from said first origin edge to provide an increased maximum moment capacity for said moment resisting section.

8. The apparatus according to claim 6 wherein said moment resisting section further comprises said first leg member connected to said second leg member along said lateral axis comprises a rigid connection about said lateral axis to maintain said first card leg and said second card leg in said landscape standing position with said support surface.

9. The apparatus according to claim 1 wherein said first connection portion further comprises a first channel radially aligned with said first leg member to accept said first origin edge.

10. The apparatus according to claim 1 wherein said second connection portion further comprises a second channel radially aligned with said second leg member to accept said second origin edge.

11. The apparatus according to claim 1 wherein said leg position angle further comprises an angle of about greater than or equal to 90°.

12. The apparatus according to claim 1 wherein said leg position angle further comprises at an angle of around less than or equal to 15°.

13. The apparatus according to claim 1 above wherein said leg position angle further comprises an angle of around greater than or equal 165°.

14. The apparatus according to claim 1 wherein said leg position angle further comprises an angular range of between around equal to or greater than 15° to around less than or equal to 165°.

15. A card positioning assembly comprising:

a) an envelope configured to contain a card, a card ornament, and a moment resisting section;

b) said card comprising a longitudinally aligned fold having a first origin end, a first card leg and a second card leg radially extending from said longitudinally aligned fold, a first origin edge end radially extending from said first origin end;

c) said card further comprising a first origin edge perpendicular to said longitudinally aligned fold and extending along said first card leg from said first origin end, a second origin edge perpendicular to said longitudinally aligned fold and extending along said second card leg from said first origin end;

d) said moment resisting section further comprising a first leg member connected to a second leg member along a lateral axis, said first leg member and said second leg member radially extending from said lateral axis at a leg position angle;

e) said moment resisting section further configured to connect to said first origin end of said longitudinally aligned fold;

f) said first leg member further comprising a first connection portion to maintain a connection with said first card leg along said first origin edge, said second leg member further comprising a second connection portion to maintain a connection with said second card leg along said second origin edge;

g) said moment resisting section further comprising a foot portion, said foot portion comprising a heel section and a toe section;

h) said card ornament configured to attach to said moment resisting section, said card ornament comprising an ornament base to provide a seated connection to said moment resisting section.

16. A method for positioning a card, said method comprising: a) providing a card comprising a longitudinally aligned fold having a first origin end, a first card leg and a second card leg radially extending from said longitudinally aligned fold, a first origin edge end radially extending from said first origin end; said card further comprising a first origin edge perpendicular to said longitudinally aligned fold and extending along said first card leg from said first origin end, a second origin edge perpendicular to said longitudinally aligned fold and extending along said second card leg from said first origin end; b) providing a moment resisting section configured to resist a card destabilizing moment acting on said card, said moment resisting section maintaining said card in a standing position; c) frictionally connecting said moment resisting section to said first origin end of said longitudinally aligned fold; d) maintaining said first card leg and said second card leg at a leg position angle; e) resisting said card destabilizing moment with said moment resisting section by further providing a foot portion on said moment resisting section, said foot portion comprising a heel section and a toe section, whereas providing a card ornament interoperable with the moment resisting section and the card ornament comprising an ornament base to provide a seated connection to said moment resisting section.

17. The method according to claim 16 wherein said method further comprises maintaining said card in said standing position by:

a) arranging said longitudinally aligned fold perpendicular to a support surface;

b) utilizing said foot section of said moment resisting section to resist said card destabilizing moment comprising an air pressure condition against said first card leg about said first origin edge.

18. The method according to claim 16 wherein said method further comprises maintaining said card in said standing position by:

a) arranging said longitudinally aligned fold in a parallel position to said support surface;

b) utilizing said foot section of said moment resisting section to resist said card destabilizing moment comprising a uniform dead load of said card acting about said longitudinally aligned fold.

* * * * *